US005092296A

United States Patent [19]

Günter et al.

[11] Patent Number: 5,092,296

[45] Date of Patent: Mar. 3, 1992

[54] APPARATUS WITH A THROTTLE DEVICE DETERMINING THE OUTPUT OF A PRIME MOVER

[75] Inventors: Spiegel Günter, Worms; Zieger Detlev; Walter Gross, both of Markgröningen, all of Fed. Rep. of Germany

[73] Assignee: Robert Bosch GmbH, Stuttgart, Fed. Rep. of Germany

[21] Appl. No.: 671,914

[22] PCT Filed: Aug. 10, 1990

[86] PCT No.: PCT/DE90/00618

§ 371 Date: Mar. 22, 1991

§ 102(e) Date: Mar. 22, 1991

[87] PCT Pub. No.: WO91/02891

PCT Pub. Date: Mar. 7, 1991

[30] Foreign Application Priority Data

Aug. 22, 1989 [DE] Fed. Rep. of Germany ....... 3927654
Jul. 18, 1990 [DE] Fed. Rep. of Germany ....... 4022825

[51] Int. Cl.$^5$ ........................ F02D 11/10; F02D 9/08; F16K 1/22

[52] U.S. Cl. .................................... 123/337; 123/399; 251/305

[58] Field of Search ............... 123/337, 361, 399, 400, 123/401; 251/305, 306, 336, 337

[56] References Cited

U.S. PATENT DOCUMENTS

| | | | |
|---|---|---|---|
| 4,561,158 | 12/1985 | Johnson et al. | 123/337 X |
| 4,938,452 | 7/1990 | Imamura et al. | 251/305 |
| 5,002,032 | 3/1991 | Kolberg | 123/399 |
| 5,005,545 | 4/1991 | Wendel et al. | 123/337 |
| 5,027,766 | 7/1991 | Zentgraf et al. | 123/399 X |
| 5,035,214 | 7/1991 | Daly et al. | 123/337 |

FOREIGN PATENT DOCUMENTS

| | | | |
|---|---|---|---|
| 0306640 | 3/1989 | European Pat. Off. | 123/399 |
| 0151671 | 8/1984 | Japan | 251/305 |
| 0024129 | 1/1989 | Japan | 123/337 |
| 2219637 | 12/1989 | United Kingdom . | |

*Primary Examiner*—Willis R. Wolfe
*Attorney, Agent, or Firm*—Edwin E. Greigg; Ronald E. Greigg

[57] ABSTRACT

A throttle valve apparatus, including a throttle valve shaft that is actuated in an axial direction with the aid of a magnet toward a housing stop. The magnet is necessary in any case to actuate a clutch. The location of the throttle valve shaft is defined exactly and without play, without requiring a separate component for this purpose.

20 Claims, 2 Drawing Sheets

APPARATUS WITH A THROTTLE DEVICE DETERMINING THE OUTPUT OF A PRIME MOVER

BACKGROUND OF THE INVENTION

The invention is based on an apparatus, in particular for a vehicle, having a throttle device determining a power of a prime mover.

There are various possible ways of preventing a rotatable throttle device from executing a highly undesirable displacement in the direction parallel to its axis of rotation.

For example, a spring may be provided, which is located between a housing which the throttle device and acts axially upon the throttle device, seeking to act on a shoulder of the throttle device counter to a shoulder on the housing. However, that has the disadvantage of requiring an additional spring, and of additional friction that is created between this spring and the rotatable throttle device.

It is also known to provide a plunge cut on the shaft on which the throttle device is supported and to secure a strap to the throttle device housing that engages this plunge cut and thus secures the throttle device shaft against axial displacement. However, that has the disadvantage that if clamps are to be avoided, the shaft cannot be secured in a play-free manner. This is especially disadvantageous since an increased air leakage gap must be provided between the throttle valve and the throttle device housing to match this axial play. Furthermore, if a potentiometer is actuated via the throttle valve shaft, there is a disadvantageous effect on the service life and operational reliability of this potentiometer. For the operating behavior of the apparatus, a decisive factor is to provide the smallest possible air leakage gap between the throttle valve and the throttle device housing.

ADVANTAGES OF THE INVENTION

The apparatus according to the invention has the advantage in particular that the location of the throttle device relative to the throttle device housing in the direction parallel to its axis of rotation is defined exactly and in particular without play. No separate component whatever is required for exact definition of the location of the throttle device in the direction of the axis of rotation. An air leakage gap between the throttle device and the throttle device housing can be kept quite small by an advantageous close selection of tolerances.

Often, the rotational position of the throttle device is measured with the aid of a potentiometer. The axially play-free support has a positive effect on the functional reliability and service life of this potentiometer as well.

Advantageous further features of and improvements to the apparatus disclosed are attainable with the provisions recited in the dependent claims.

Particularly with the proposed disposition of the drive wheel, magnet and armature, a simple, sturdy, small-sized, long-lived, functionally safe and reliable kind of structure is attained.

If the apparatus is embodied such that, if the magnetic force that is for instance provided upon failure of a servomotor should itself fail, coupling of the throttle device to an emergency actuation apparatus is effected, then further operation of the apparatus is assured even if electrical components fail.

DRAWING

Exemplary embodiments of the invention are shown in simplified form in the drawing and described in further detail in the ensuing description.

FIGS. 1 and 2 each show one exemplary embodiment.

DESCRIPTION OF THE EXEMPLARY EMBODIMENTS

Figure 1:
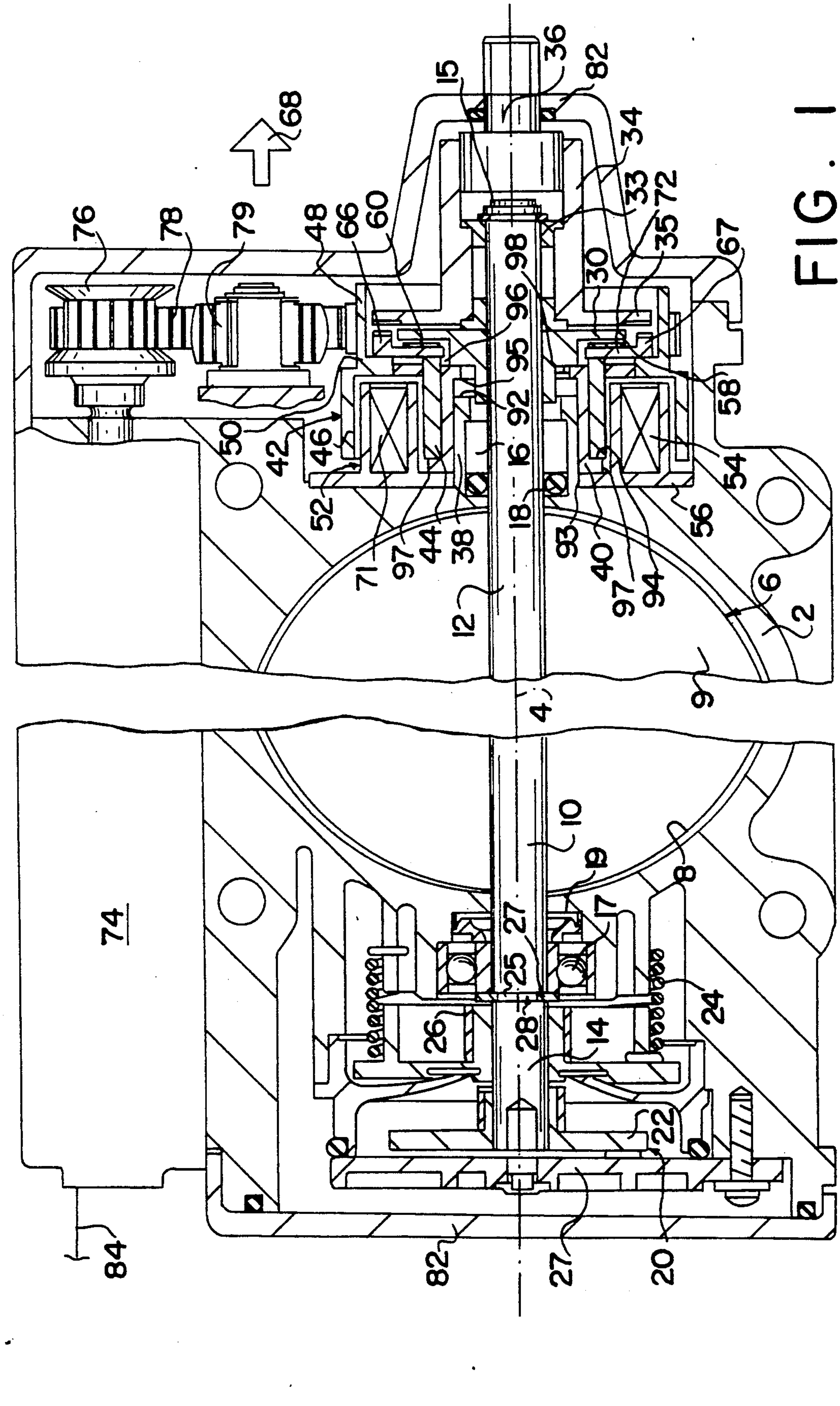

The structure and mode of operation of an apparatus having a throttle device, embodied according to the invention, will now be described in further detail in terms of an exemplary embodiment, in conjunction with the drawing.

The apparatus according to the invention can be used to control the output of the prime mover, although not solely limited to this, it is assumed in the description of the exemplary embodiment, for the sake of simplicity, that the apparatus according to the invention is installed in a vehicle having an Otto engine as its prime mover and having a throttle valve as the throttle device. However, the apparatus according to the invention can also be used in machines mounted in stationary fashion as well as if the prime mover is a Diesel engine, electric motor, and so forth.

FIG. 1 shows a cross section through the apparatus according to the invention. To save space, a middle region of the apparatus is not shown in the drawing. One skilled in the art can reconstruct this region in a known manner.

The drawing shows a throttle device housing 2 with a throttle device 6 pivotably supported about an axis of rotation 4. Extending vertically of the sectional plane shown is an intake tube 8 with an intake tube wall. The throttle device, in the exemplary embodiment shown, includes a throttle valve 9 and a throttle valve shaft 10. The throttle valve shaft 10 extends centrally to the axis of rotation 4 transversely through the intake tube 8. The throttle valve 9 is connected to the throttle valve shaft 10 and pivotable therewith. By rotation of the throttle valve shaft 10 with the throttle valve 9 about the axis of rotation 4, a free cross section of the intake tube 8 inside the intake tube wall can be varied.

The throttle valve shaft 10 protrudes through the intake tube wall past the intake tube 8 on two ends. On one end, the throttle valve shaft 10 protrudes past the intake tube wall with a first shaft end 12, and on the other end the throttle valve shaft 10 protrudes past the intake tube wall with a second shaft end 14. The throttle valve shaft 10 ends in a face end 15 on the side of the first shaft end 12. The shaft end 12 is rotatably supported inside the throttle device housing, in the region where it passes through the wall of the intake tube 8, with the aid of a bearing element 16 and is sealed off with the aid of a seal 18. The shaft end 14 is rotatably supported inside the throttle device housing, in the region where it passes through the intake tube wall, with the aid of a bearing element 17 and is sealed off with the aid of a seal 19.

A potentiometer 20 is located on the second shaft end 14 of the throttle valve shaft 10. The potentiometer 20 includes a fixed printed wiring board 21 and a wiper 22. The printed wiring board 21 is firmly connected to the throttle device housing 2. The wiper 22 is secured to the second shaft end 14 of the throttle valve shaft 10. Upon rotation of the throttle device 6, the wiper 22 travels along a conductor track provided on the printed wiring board 21. With the aid of the potentiometer 20, an instantaneous rotational angle of the throttle device 6 can be ascertained as an actual value.

A restoring spring 24 is located in the vicinity of the second shaft end 14. The restoring spring 24 acts by one end on the throttle device housing 2 and by another, via the second shaft end 14, on the throttle valve shaft 10 in the closing direction. The restoring spring 24 is a helically coiled spiral spring.

A groove 25 is provided on the second shaft end 14 of the throttle device 6. A securing disk 26 is placed in the groove 25. An emergency stop 27 is provided on the throttle device housing. With the aid of the securing device 26 and the emergency stop 27, the second shaft end 14 is prevented from plunging too far in the direction parallel to the axis of rotation 4 in the direction of the intake tube 8. The emergency stop 27 can be provided directly on the throttle device housing 2, or as shown in the drawing it may be provided on the bearing element 17. The bearing element, in the exemplary embodiment shown, is embodied such that it is also capable of transmitting axial forces from the securing disk 26 in the groove 25 to the throttle device housing 2. A small axial play 28 is suitable between the securing disk 26 and the emergency stop 27.

A predominantly rotationally symmetrical shoulder 30 embodied in stepped fashion is firmly connected to the first shaft end 12. The shoulder 30 is located outside the wall of the intake tube 8. On the side of the shoulder 30 remote from the intake tube 8, a coupler 34 is rotatably supported on the first shaft end 12 with the aid of a further bearing element or elements 33.

The coupler 34 is predominantly rotationally symmetrical and protrudes axially past the first shaft end 12. A collar 35 is integrally formed onto the coupler 34. In the radial direction, the collar 35 protrudes past the shoulder 30. A shaft stub 36 is pressed into the coupler 34 inside a part of the coupler 34 protruding past the shaft end 12 and in alignment with the throttle valve shaft 10.

A tubular, stepped housing part 38 is integrally formed onto the throttle device housing 2. Located on the inside of the housing part 38 are the bearing element 16 and the seal 18 for supporting and sealing off the first shaft end 12 of the throttle valve shaft 10. A bearing bush 40 is disposed on an outer jacket of the tubular housing part 38. The bearing bush 40 serves, among other purposes, to support a drive wheel 42 freely rotatably on the housing part 38, or in other words relative to the throttle device housing 2. The drive wheel 42 is supported concentrically with the throttle valve shaft 10. The bearing bush 40 makes low-wear and low-friction rotatability of the drive wheel 42 relative to the throttle device housing 2 possible. The bearing bush 40 may for example be a roller bearing or a slide bearing.

The drive wheel 42 can be divided into an inner tubular part 44, an outer tubular part 46, a third tubular part 48, and a substantially radially extending part 50. The part 50 of the drive wheel 42 joins the two tubular parts 44, 46 to one another. The two tubular parts 44, 46 are disposed on the side of the radially extending part 50 oriented toward the intake tube 8. The third tubular part 48 of the drive wheel 42 is located on the radially extending part 50 on the end remote from the intake tube 8. A magnet 52 plunges into a cylindrical space between the inner tubular part 44 and the outer tubular part 46 of the drive wheel 42. The magnet 52 is an electromagnet and includes a magnet coil 54 in a magnet housing 56. Via the magnet housing 56, the magnet 52 is firmly joined to the throttle device housing 2. The magnet housing 56 surrounds the annular magnet coil 54 on three sides. The magnet housing 56 comprises a magnetically conductive material and is open on the side toward the radially extending part 50 of the drive wheel 52. Radial plays existing between the inner tubular part 44 of the drive wheel 42 and the magnet 52, and between the magnet and the outer tubular part 46, are suitably rather small. A spacing in the axial direction between the radially extending part 50 of the drive wheel 42 and the magnet 52 is part 50 of the drive wheel 42 and the magnet 52 is likewise advantageously rather small. Small plays and a small spacing promote a transfer of magnetic flux between the magnet 52 and the drive wheel 42.

The shoulder 30 has a face end 58 oriented toward the intake tube 8. Viewed in the axial direction, the radial part 50 of the drive wheel 42 is disposed such that the part 50 is located on the face end 58 of the shoulder 30. A tensioning spring 60 is disposed on the face end 30, toward the radial part 50 of the drive wheel 42, of the shoulder 30 connected to the throttle valve shaft 10. The tensioning spring 60 has the form of an annular, flat disk. The tensioning spring 60 is connected at individual points, at intervals of 60°, for example, to the face end 58 of the shoulder 30. Between these points, the tensioning spring 60 is firmly connected at further points to a clutch element 66. An arrow 68 is shown in the drawing. The arrow 68 extends parallel to the axis of rotation 4 and points from the direction of the second shaft end 14 toward the first shaft end 12, or beyond it. If the clutch element 66 is actuated counter to the arrow 68 in the direction away from the shoulder 30, then the tensioning spring 60 acts upon the clutch element 66 in the direction of the arrow 68.

Via the disk-like tensioning spring 60, a torque can advantageously also be transmitted between the clutch element 66 and the shoulder 30. The clutch element 66 protrudes radially past the shoulder 30. A collar 67 is integrally formed onto the protruding part of the clutch element 66. The collar 67 extends far enough in the direction of the arrow 68 that when the clutch element 66 is actuated in the direction of the arrow 68, the collar 67 comes to rest on the collar 35 of the coupler 34.

The inner tubular part 44 and the outer tubular part 46 and optionally a portion of the radial part 50 of the drive wheel 42 as well comprise a magnetically conductive material. At least one portion 71 of the radial part 50 between the two tubular parts 44, 46 of the drive wheel 42 comprises a material that is not magnetically conductive. This assures that a magnetic flux in the two tubular parts 44, 46 will not be short-circuited by the radial part 50 of the drive wheel 42. The clutch element 66 is located at least partially but preferably completely inside the drive wheel 42, on the end of the radial part 50 of the drive wheel 42 remote from the magnet 52.

The shoulder 30 is likewise advantageously located at least partly inside the drive wheel 42. Viewed in the radial direction, the clutch element 66 overlaps the radial part 50 of the drive wheel 42, at least in part. When there is no current to the magnet 52, there is a spacing in the axial direction between the clutch element 66 and the radial part 50 of the drive wheel 42.

When the magnet coil 54 of the magnet 52 is carrying current, a magnetic flux results through part of the magnet housing 56, through the narrow gaps between the magnet housing 56 and the tubular parts 44, 46 of the drive wheel 42, and through the tubular parts 44, 46. Because of the magnetically nonconductive portion 71 of the radial part 50, the magnetic flux extends through the clutch element 66. When there is current to the magnet 52, the result is a magnetic force upon the clutch element 66 counter to the arrow 68. At least a portion of the clutch element 66 thus forms an armature for the magnet 52, and at least individual parts 44, 46, 50 of the drive wheel 42 serve at least partly as pole pieces for the magnet 52. If there is adequate current to the magnet 52, the clutch element 66 is actuated counter to the radial part 50 of the drive wheel 42, and a torque can be transmitted between the radial part 50 of the drive wheel 42 and the clutch element 66. When there is no current to the magnet 52, the tensioning spring 60 displaces the collar 67 of the clutch element 66 against the counter 35 of the coupler 34. Once the clutch element 66 has been displaced in this displacement direction, a torque can be transmitted between the coupler 34 and the clutch element 66.

A servomotor 74 having a rotor is disposed laterally of the throttle device housing 2. One end of the rotor is embodied as a pulley 76. The pulley 76 of the servomotor 74 and the third tubular part 48 of the drive wheel 42 are joined to one another via a belt 78. A necessary tension in the belt 78 can be adjusted by means of a resilient tensioning wheel 79. The belt 78 may for instance be a V-belt, toothed belt, chain or the like, and a rod linkage or gear system is also possible. If there is adequate current to the magnet 52, the apparatus according to the invention operates in a first functional state. If there is no current to the magnet 52, then the apparatus operates in a second functional state. The first functional state is the normal one, for most applications. A transition to the second functional state take place if an electrical element fails. This assures that if an arbitrary electrical element, required in the first functional state, fails, then the apparatus according to the invention can continue to be used virtually without any impairment, with the aid of the emergency actuating means.

In the first functional state, a pivoting motion of the pulley 76 of the servomotor 74 can be transmitted by means of the belt 78 to the throttle valve 9, via the drive wheel 42, the clutch element 66, the tensioning spring 60, the shoulder 30, and the throttle valve shaft 10.

In the second functional state, the clutch element 66 is displaced in the direction of the arrow 68, and a pivoting motion of the shaft stub 36 can be transmitted via the coupler 34, the collar 35 of the coupler 34 and the collar 67 of the clutch element 66, to the clutch element 66 and from their via the tensioning spring 60 to the shoulder 30 and via the throttle valve shaft 10 to the throttle valve 9.

A housing 82 is a component of the apparatus according to the invention, and essentially only a connection cable 84 and one end of the shaft stub 36 protrude out of the housing 82.

A gas pedal, not shown, via a gas cable, also not shown, may be pivotably connected to the end of the shaft stub 36 protruding from the housing 82. Thus any motion of the gas pedal can be transmitted to the throttle valve 9 in the second functional state. With the aid of an electric control device, not shown, the servomotor 74 can be triggered via the cable 84. Via the potentiometer 20, the rotational angle of the throttle valve 9 is monitored and reported to the control device. Via the servomotor 74, the throttle valve 9 can be adjusted in the first functional state until such time as the actual value ascertained by the potentiometer 20 corresponds to a desired set-point value. The control device, not shown, may be located inside or outside the housing 82.

The side of the radial part 50 of the drive wheel 42 oriented toward the clutch element 66 has a more or less rough surface, for example, and the side of the clutch element 66 coming to rest on it likewise has a more or less rough surface, so that any required torque can be transmitted. Teeth may be provided instead of the rough surfaces, in which case the frictional connection would be replaced with a form-fitting connection, for example. The location on the collar 67 of the clutch element 66 and the location on the collar 35 of the coupler 34 at which these two parts contact one another can be provided with a set of teeth, so that the necessary torque can be transmitted from the coupler 34 to the clutch element 66. The teeth of the coupler 34 and of the clutch element 66 can be embodied such that if an electrical element fails while the throttle valve 9 is open farther than the position of the coupler 34 would require, the throttle valve 9 can be closed by the restoring spring 24 far enough that the position of the throttle valve 9 again corresponds to the position of the coupler 34 and the teeth only now mesh to such an extent that the torque can be transmitted. The teeth may also be embodied such that even if an electrical element fails, the throttle valve 6 is closed farther than would correspond to the position of the coupler 34, and yet the teeth of the clutch element 66 can nevertheless mesh with the teeth of the coupler 34. In this case, the prime mover, not shown, can continue to be operated virtually without restriction. If the teeth are oblique, for instance, then after a transitional phase the entire power of the prime mover is again available. Especially the advantageous embodiment of the location at which the clutch element 66 comes to engage the coupler 34 has been described in detail in an application entitled "Einrichtung zum Übertragen einer Stellposition eines Bedienelements" [Apparatus for Transmitting a Control Position of an Operating Element"], which was filed in the German Patent Office on the priority date (Aug. 22, 1989) of the present application and was assigned German Serial No. P 39 27 655.4. For the sake of simplicity, reference is made in this application to the description thereof and that description will not be repeated here. The full scope of what is described in that application applies to the present one as well.

The shaft stub 36 may also be embodied such that it is rotatable relative to the coupler 34 by a certain rotational angle. This affords further opportunities for application of the invention, as described in the aforementioned German Patent Application P 39 27 655.4.

The magnet housing 56 has a first face end 91, and the throttle device housing 2 has a second face end 92. The bearing bush 40 has a third face end 93, a fourth face end 94, a fifth face end 95 and a sixth face end 96. The drive wheel 42 has a seventh face end 97, and the shoulder 30 has an eighth face end 98. The face ends 91, 92, 94 and 96 point in the direction of the arrow 68. The face ends 93, 95, 97 and 98 point counter to the arrow 68.

The possibility exists of joining the bearing bush 40 firmly to the drive wheel 42. If there is adequate current to the magnet coil 54, the magnet 52 pulls the shoulder 30, and thus the throttle valve shaft 10 and the throttle valve 9 counter to the arrow 68, via the drive wheel 42, the armature 72 and the tensioning spring 60. The drive wheel 42 is also actuated counter to the arrow 68. Via the eighth face end 98 and the sixth face end 96, the shoulder 30 presses on the bearing bush 40, and via the third face end 93 of the bearing bush 40 it presses on the first face end 91 and thus on the throttle device housing 2 counter to the arrow 68. The axial location of the shoulder 30, throttle valve shaft 10 and throttle valve 9 relative to the throttle device housing 2 is thus defined exactly, and in particular, without play. Moreover, this also provides play-free fixation of the location of the drive wheel 42 in the direction of the axis of rotation 4.

It is also possible to lengthen the housing part 38 in the direction of the arrow 68 far enough that when there is current to the magnet 52, the fifth face end 95 of the bearing bush 40 rests directly on the housing part 38 and thus on the throttle device housing 2. In this way as well, the location of the throttle device 6 in the direction of the axis of rotation 4 can be defined without play.

It is also possible to join the bearing bush 40 firmly not to the drive wheel 41 but rather to the housing part 38 of the throttle device housing 2. In this case, as well, if there is adequate magnetic force of the magnet 52, the location of the shoulder 30 and thus of the throttle device 6 is defined axially exactly, and in particular without play, via the eighth face end 98 of the shoulder 30 and the sixth face end 96 of the bearing bush 40.

Figure 2:
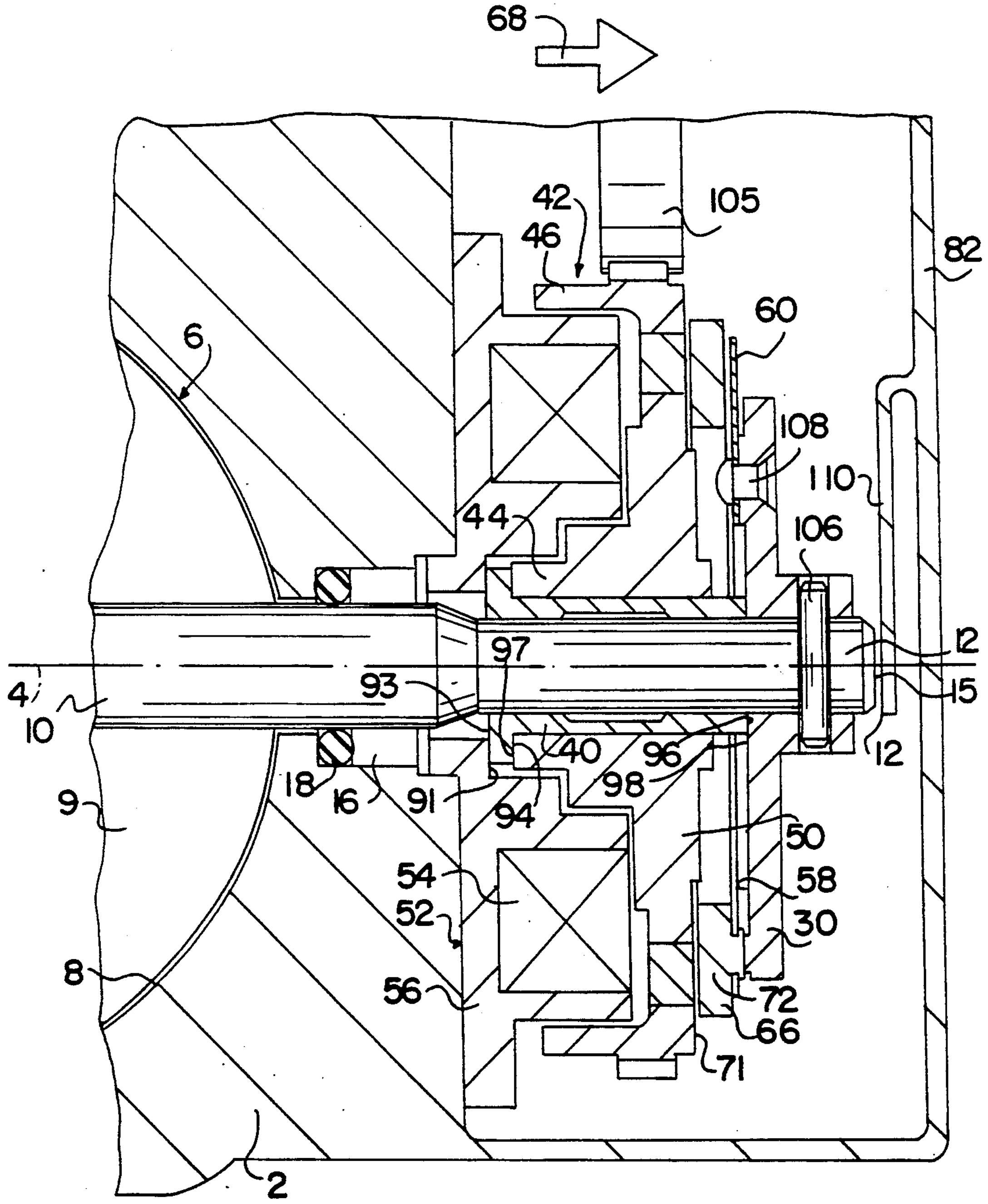

FIG. 2 shows a cross section through the second exemplary embodiment of the apparatus of the invention. To save space, various parts of the apparatus are not shown in the drawing in FIG. 2. One skilled in the art can expand this region as shown in FIG. 1 or in a known manner. In all the drawing figures, elements that are the same or function the same are provided with the same reference numerals. The exemplary embodiments of FIGS. 1 and 2 are largely identical in structure, and the ensuing description therefore essentially refers only to various differences between them.

In contrast to FIG. 1, no mechanical emergency actuation of the throttle device 6 is shown in FIG. 2. In FIG. 2, the drive wheel 42 is driven via a pinion 105 driven by an electric motor. The shoulder 30 is firmly joined to the throttle valve shaft 10 of the throttle device 6, with the aid of a pin 106.

In both exemplary embodiments, the tensioning spring 60 has largely the same shape, and in both exemplary embodiments it is joined in the same manner to the shoulder 30 and to the clutch element 66. This is shown somewhat more clearly in FIG. 2, because of the scale. The disk like tensioning spring 60 is joined to the shoulder 30 with the aid of rivets 108 at three points distributed uniformly over the circumference. At three further points, for example, offset from the first, the tensioning spring 60 is firmly joined to the clutch element 66, that is, to the armature 72.

If there is adequate current to the magnet coil 54 in the second exemplary embodiment of FIG. 2, then its magnetic force actuates the drive wheel 42, armature 72, clutch element 66, and via the tensioning spring 60 the shoulder 30 as well and thus the throttle valve shaft 10 also, counter to the arrow 68, until the bearing bush 40, preferably firmly joined to the drive wheel 42, rests with its third face end 93 on the first face end 91, and its eighth face end 98 also rests on the sixth face end 96. If the drive wheel 42 is rotated with the aid of the pinion 105, then the third face end 93 rotates relative to the first face end 91. Since the shoulder 30 is rotated along with the drive wheel 42, there is no relative motion in normal operation between the face ends 96, 98.

The apparatus shown in part and by way of example in FIG. 2 can likewise be provided with an emergency actuation. In this exemplary embodiment, the emergency actuation means is disposed on the first shaft end 12, not shown in FIG. 2, of the throttle valve shaft 10.

In the first functional state (normal operation), there is current to the magnet 52, and the servomotor 74, not shown in FIG. 2, is connected to the throttle device 6 via the pinion 105, drive wheel 42, clutch element 66, tensioning spring 60 and shoulder 30. If the servomotor 74, for instance, fails, then the magnet coil 54 is switched to the currentless state, and the servomotor 74 is uncoupled from the throttle device 6, so that the throttle device 6 is actuatable via the emergency actuating means disposed on the second shaft end 14, not shown in FIG. 2.

If no mechanical emergency actuating means is built in, then the magnet 52 is embodied such that if there is an electrical defect the magnet 52 can be shut off, for instance in order that the servomotor 74 will no longer be undesirably able to displace the throttle device 6.

If an emergency actuating means is provided in the exemplary embodiment shown in FIG. 2, then it can be assured with the aid of an emergency stop 110 that if the magnetic force of the magnet 52 fails, the throttle valve shaft 10 will not move overly far in the direction of the arrow 68. The emergency stop 110 is for example a strap joined to the housing 82. However, the emergency stop 110 may also be a screw connected to the housing 82, which points with its face end toward the face end 15 of the first shaft end 12. The screw may also be joined to a cap of the housing 82. Since failure of the magnetic force 52 can be expected to occur virtually never, then a certain axial play of the throttle valve shaft 10 can be allowed without difficulty, for this case which arises virtually never. It is therefore also possible to allow a more or less large axial play 112 between the face end 15 of the shaft end 12 pointing in the direction of the arrow 68, and the emergency stop 110. The same is also true for the axial play 28 described in conjunction with the first exemplary embodiment.

The apparatus shown by way of example in FIGS. 1 and 2 operates virtually always in the first functional state (normal operation). In the first functional state, it is assured that the location of the throttle device 6, or in other words of the throttle valve shaft 10 and throttle valve 9, can be defined exactly and without play in the direction parallel to the axis of rotation 4. This is effected by causing a throttle device stop of the throttle device 6 to rest, with the aid of the magnetic force of the magnet 52, on a housing stop of the throttle device housing 2. Depending on the structural embodiment of apparatus, the housing stop is the first face end 91 and/or the second face end 92 and/or the fourth face end 94 and/or the sixth face end 96, for example. Likewise depending on the structural embodiment of the proposed apparatus, the throttle device stop is the third face end 93 and/or the fifth face end 95 and/or the seventh face end 97 and/or the eighth face end 98, for example.

In the apparatus described, the magnet 52 is necessary for coupling the servomotor 74 to the throttle device 6, via the drive wheel 42, the clutch element 66, the tensioning spring 60 and the shoulder 30. As long as the components necessary for transmitting force are disposed as described, this also, without requiring additional components, assures satisfactory, play-free axial positioning of the throttle device 9, in particular of the throttle valve 9, relative to the throttle device housing 2.

In the apparatus proposed, the throttle valve shaft 10 is actuated in the axial direction toward the housing stop provided with the aid of the magnet, in an inventive manner. The magnet 52 is necessary in any case to transmit torque. The axial location of the throttle device 6 is defined exactly and without play, without requiring a separate component for this. The emergency stop 27 along with the securing disk 26 or the emergency stop 110 come into play only in an emergency, or in other words virtually never. In the apparatus according to the invention, the emergency stop 27, 110 may also be omitted.

We claim:

1. An apparatus, in particular for vehicles, having a throttle device (6) which functions to determine a power of a prime mover and rotatable relative to a throttle housing (2) about an axis of rotation (4), further having a magnet (52) that generates a magnetic force, the magnetic force of which acts upon the throttle device housing (2) and on the throttle device (6) so as to actuate a throttle device stop (93, 95, 97, 98) of the throttle device (6) in a first direction toward a throttle bore (8) and parallel to the axis of rotation (4) counter to a housing stop (91, 92, 94, 96) of the throttle housing (2).

2. An apparatus as defined by claim 1, in which upon an actuation of the throttle device (6) in a second direction away from said throttle bore that is opposite to the first direction parallel to the axis of rotation (4), a second throttle device stop can come to rest on a second housing stop.

3. An apparatus as defined by claim 1, in which the magnet (52) is joined to the throttle device housing (2), wherein the magnetic force actds upon the throttle device (6) via an armature (72) joined to the throttle device (6).

4. An apparatus as defined by claim 3, in the armature (72) is joined to the throttle device (6) via a tensioning spring (60).

5. An apparatus as defined by claim 3, in which a drive wheel (42) is provided between the magnet (52) and the armature (72).

6. An apparatus as defined by claim 5, in which the magnetic force acts upon the armature (72) in order to transmit a torque between the throttle device (6) and the drive wheel (42).

7. An apparatus as defined by claim 6, in which the transmission of the torque is effected via the armature (72).

8. An apparatus as defined by claim 6, in that if the magnetic force fails, coupling of the throttle device (6) is effected with an emergency actuation device (34, 36).

9. An apparatus as defined in claim 8, in which the coupling is effected via the armature (72).

10. An apparatus as defined by claim 5, in which a magnetic flux of the magnet (52) is carried to the armature (72) through at least a portion of the drive wheel (42).

11. An apparatus as defined by claim 10, in which at least a portion of the drive wheel (42) forms at least some pole pieces of the magnet (52).

12. An apparatus as defined by claim 5, in which the armature (72) is disposed at least partly inside the drive wheel (42).

13. An apparatus as defined by claim 5, in which the magnet (52) is at least partly enveloped by the drive wheel (42).

14. An apparatus as defined by claim 2 in which the magnet (52) is joined to the throttle device housing (2), wherein the magnetic force acts upon the throttle device (6) via an armature (72) joined to the throttle device (6).

15. An apparatus as defined by claim 4, in which a drive wheel (42) is provided between the magnet (52) and the armature (72).

16. An apparatus as defined by claim 7, in that if the magnetic force fails, coupling of the throttle device (6) is effected with an emergency actuation device (34, 36).

17. An apparatus as defined by claim 6, in which a magnetic flux of the magnet (52) is carried to the armature (72) through at least a portion of the drive wheel (42).

18. An apparatus as defined by claim 7, in which a magnetic flux of the magnet (52) is carried to the armature (72) through at least a portion of the drive wheel (42).

19. An apparatus as defined by claim 8, in which a magnetic flux of the magnet (52) is carried to the armature (72) through at least a portion of the drive wheel (42).

20. An apparatus as defined by claim 9, in which a magnetic flux of the magnet (52) is carried to the armature (72) through at least a portion of the drive wheel (42).

* * * * *